Oct. 10, 1950  R. E. HALL  2,525,544
CATHODE-RAY TUBE CONTROL CIRCUITS
Filed Feb. 20, 1947
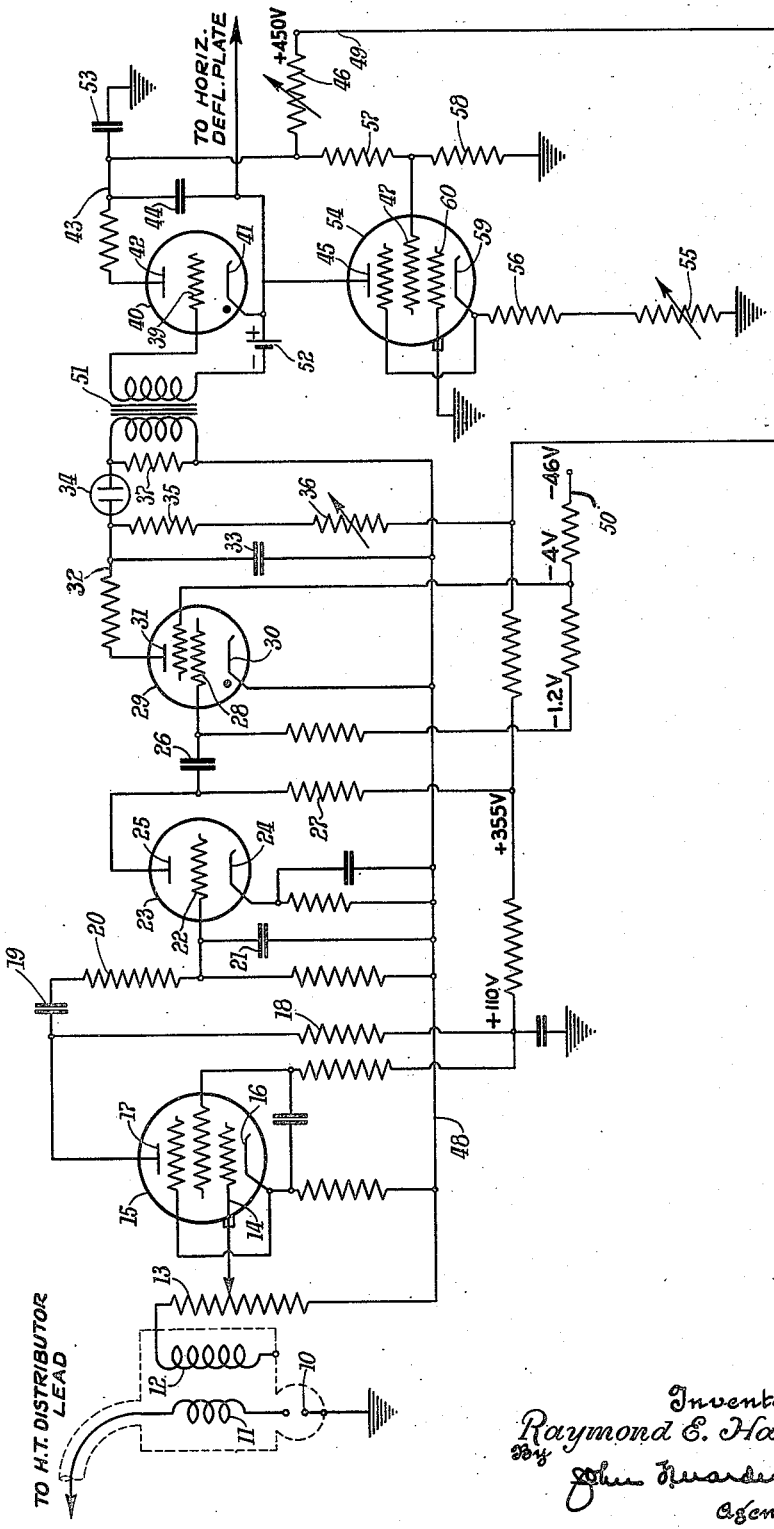
Inventor
Raymond E. Hall
By
John [signature]
Agent Patented Oct. 10, 1950

2,525,544

UNITED STATES PATENT OFFICE 2,525,544

CATHODE-RAY TUBE CONTROL CIRCUITS

Raymond E. Hall, Glen Ridge, N. J.

Application February 20, 1947, Serial No. 729,726

1 Claim. (Cl. 250—36)

This invention relates to a method and means for synchronizing the potential applied to the time-base or horizontal trace deflecting plates of a cathode ray tube to be used for visually indicating a repetitive function such as the ignition circuit voltages for an internal combustion engine and so that the position of the vertical wave on the horizontal time-base may be controlled with respect to the ends of the pattern.

The invention is particularly adaptable where it is desired to analyze and represent voltages present in the primary of a magneto used in an ignition system. These voltages include reflected voltages from the secondary and from the associated circuits of the secondary. In some respects the circuit is similar to that shown in U. S. patent to Eldredge, No. 2,360,857 although the circuit shown in the aforementioned Eldredge patent is provided for a somewhat different purpose than that to which my invention relates.

In the use of a cathode ray tube for indicating ignition circuit voltages, if a control circuit such as is described in the aforementioned Eldredge patent were used, the pips or individual wave shapes on the cathode ray tube will be distorted along the horizontal axis proportional to the departure of the sweep rate from the linear rate. In the Eldredge sweep circuit the charging voltage across the capacitor in the plate circuit of the second "saw-tooth" generator tube is exponential with respect to time since the charging voltage is constant, and the series charging resistor is constant during any given sweep cycle.

In an analysis of circuit voltages for an internal combustion engine ignition system it is desirable that the pips on the cathode ray tube shall be uniformly spaced and of like shape for purposes of comparison of the individual primary voltages of the magneto. When referring to primary voltages of the magneto it is inferred that the reflected voltages on the secondary and its associated circuits are components of the magneto primary voltages.

My invention comprehends a control circuit having an improved supply of sweep voltage across the capacitor in the plate circuit of the second "saw-tooth" generator tube. This charging voltage is made more nearly linear with respect to time by applying a constant current tube in the charging circuit. With constant charging current through this capacitor a linear charging voltage is obtained which, when applied to the horizontal deflection plates of the cathode ray tube, gives uniformly spaced pips on the cathode ray tube without distortion along the horizontal axis.

With the aforementioned explanation in mind, it is the object of this invention to provide an improved apparatus for controlling the sweep circuit of an oscillograph from the source of voltage impulses which are to be shown, each impulse acting upon a delay circuit to time the sweep circuit a variable fraction of a cycle late so that the succeeding impulses from the primary of the magneto producing vertical deflection may be placed at the desired position on the oscillograph screen, and so that a split pattern may be avoided.

Another object is to provide an improved apparatus for controlling the sweep circuit of an oscillograph whereby the pips on the oscillograph screen shall be uniformly spaced and of like shape.

These and other objects and advantages will be found apparent from the following description and from the attached drawing which illustrates an embodiment of the invention.

The drawing is a wiring diagram of the connections including a transformer which produces a voltage pulse in the secondary upon the firing of a spark plug and a means embodying this invention for controlling the position of the wave shapes on an oscillograph screen.

Referring to the drawing, the discharge current of spark plug 10 passes through the transformer primary 11 in series with a high tension spark plug lead from a distributor, inducing a voltage pulse in the transformer secondary 12. Voltage induced in the secondary 12 is passed to an attenuator 13 from which it is impressed upon the grid 14 of a conventional pentode amplifier 15 having a cathode 16 and a plate 17. The output pulse from pentode 15 is passed through a resistance coupler consisting of a resistor 18 and a capacitor 19 into an integrating circuit composed of a resistor and a capacitor 21. This serves to suppress the high frequency components of the amplified alternating current output of the transformer and to pass the impulse on to the grid 22 of a triode 23. This triode has the usual cathode 24 and plate 25.

The amplified and integrated impulse is passed through a resistance coupler consisting of a capacitor 26 and resistor 27 to the grid 28 of a normally nonconducting discharge tube 29 having the usual cathode 30 and plate 31. The positive voltage from the amplified impulse causes tube 29 to become conducting to current which is supplied by capacitor 33, this current flow being maintained until the charge contained in 33 is lowered to a voltage level, which will result in tube 29 being extinguished or non-conducting. At the time tube 29 becomes non-conducting, capacitor 33 immediately begins recharging from the power supply, generally designated 49, at a rate which is controlled by resistors 35 and 36. The rising voltage in the plate circuit, generally designated 32, of tube 29 is impressed upon a gas-filled diode, which may be a neon tube 34, connected to fixed resistor 35 and a variable resistor 36. At the time the ionizing voltage of tube 34 is reached, current starts to flow through that tube and it will continue until another positive impulse from the transformer is impressed upon the grid 28 of tube 29, causing the latter to become conducting and discharging capacitor 33 to a point where its potential is below the ionization potential of tube 34.

The current passed by tube 34 at the time of its ignition is differentiated by means of a transformer 51, having a shunt resistor 37 across its primary to make the circuit aperiodic, causing an initial positive impulse to be impressed upon the grid 39 on a second gaseous discharge tube 40 having the usual cathode 41 and plate 42. A suitable shunt resistor across the secondary of transformer 51 may be substituted for the shunt resistor 37 shown connected across the primary of the transformer giving the same dampening effect. The plate circuit, generally designated 43, of tube 40, is divided into three branch circuits, one of which is through the by-pass capacitor 53 to ground. The second branch circuit is through a discharge capacitor 44 to the cathode 41 of tube 40 and this circuit also leads to the horizontal deflection plate of a cathode ray tube, and further to the plate 45 of a constant current tube 54. The third branch circuit is to the direct current power source 49 through the variable resistor 46. The grid bias source 52 maintains a negative bias on the grid 39 of tube 40 so that this tube will be non-conducting except when a positive voltage pulse is applied to grid 39 through transformer 51.

The constant current tube 54 is used to limit the charging current through capacitor 44 so that its charging voltage will be linear with respect to time. The charging voltage across capacitor 44 is the sweep voltage applied to the cathode ray tube horizontal deflection plate. Voltage for the screen grid 47 of tube 54 is supplied from a voltage divider comprising resistors 57 and 58 from direct current source 49 through variable resistor 46. Variable resistor 55 which is in series with fixed resistor 56 provides a bias voltage between the cathode 59 and control grid 60 of tube 54. This bias voltage determines the plate-to-cathode resistance of tube 54 and, by adjustment of the variable resistor 55, the charging rate of capacitor 44 is controlled.

Referring again to tube 40, the action of this tube is similar to other "saw-tooth" wave generators and is consequently capable of being controlled by the impulses received upon the grid 39 of the tube. When no impulse is being received, all circuits are stable and the cathode ray tube beam remains stationary. The delay in actuation of tube 40 is controlled by variable resistor 36 in the plate circuit of tube 29. Resistor 46 acts to control the length of the trace generated by the last named tube. The usual ground return 48 and positive and negative power sources 49 and 50 are provided, together with the necessary resistors to control the potentials applied to the various plates and cathodes of the apparatus described.

The feature of this invention resides in the provision of two normally non-conducting gaseous discharge tubes coupled by a gas filled diode and a differentiating and isolating transformer, together with a constant current charging circuit. The first result obtained from the use of a circuit with the above feature, in conjunction with a cathode ray tube is the provision of a means for adjustably delaying the application of the sweep voltage to the horizontal deflection plate of the cathode ray tube, and the second result is the provision of improving linearity of the horizontal sweep. It is understood that other means may be used than those which are shown for pick-up and amplification of pulses, and that the order and character of components of the circuit may be varied without departing from the scope of my invention.

I claim:

A time delay circuit for controlling the response of the time-base deflection plates of a cathode ray tube to a succession of repetitive functions in the nature of electrical impulses including, two normally non-conducting gaseous discharge tubes having plates, cathodes and control elements, a capacitor in the circuit between the plate and cathode of the first tube, a voltage responsive gas filled diode coupled with said capacitor and adapted to be energized from said capacitor to become conducting when the potential of said capacitor reaches a predetermined value, transformer means for differentiating the current flow through said diode and for impressing a positive impulse produced thereby on the control element of said second gaseous discharge tube, a source of bias voltage for the control element of said second gaseous discharge tube, a capacitor in the circuit of said second tube between its plate and cathode, a constant current tube in series with a power source and said second tube circuit capacitor, a resistor in the plate circuit of the first gaseous tube between the power source and said capacitor in the circuit of the first gaseous discharge tube, and a resistor in the cathode circuit of the constant current tube to control the charging rate of the capacitor in the plate circuit of the second tube.

RAYMOND E. HALL.

REFERENCES CITED

The following references are of record in the file of this patent:

UNITED STATES PATENTS

| Number | Name | Date |
|---|---|---|
| 2,140,004 | Falloon | Dec. 13, 1938 |
| 2,188,845 | Ramsay | Jan. 30, 1940 |
| 2,281,948 | Pieplow | May 5, 1942 |
| 2,335,780 | McCoy | Nov. 30, 1943 |
| 2,355,363 | Christaldi | Aug. 8, 1944 |
| 2,360,857 | Eldredge | Oct. 24, 1944 |
| 2,428,038 | Rothbart | Sept. 30, 1947 |